(12) United States Patent
Raith

(10) Patent No.: US 6,259,915 B1
(45) Date of Patent: Jul. 10, 2001

(54) MULTIPLE HYPERBAND MOBILE AND BASE STATIONS

(75) Inventor: Alex Krister Raith, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/425,051

(22) Filed: Apr. 19, 1995

Related U.S. Application Data

(63) Continuation-in-part of application No. 08/356,634, filed on Dec. 15, 1994, now Pat. No. 5,594,949, which is a continuation of application No. 08/014,222, filed on Feb. 5, 1993, now Pat. No. 5,375,123, application No. 08/425,051, which is a continuation-in-part of application No. 08/331,711, filed on Oct. 31, 1994, and a continuation-in-part of application No. 08/147,254, filed on Nov. 1, 1993.

(51) Int. Cl.[7] .................................... H04Q 7/20
(52) U.S. Cl. .......................... 455/434; 455/67.1
(58) Field of Search ................... 455/54.1, 33.2, 455/54.2, 67.1, 68, 62, 33.1, 418, 423, 422, 436, 448, 447, 437, 450, 515, 434; 379/59, 60

(56) References Cited

U.S. PATENT DOCUMENTS

| | | | |
|---|---|---|---|
| 4,916,728 | 4/1990 | Blair | 379/59 |
| 5,093,926 | 3/1992 | Sasauta | 455/34 |
| 5,293,641 | 3/1994 | Kallin et al. | 455/33.1 |
| 5,440,613 | * 8/1995 | Fuentes | 379/60 |
| 5,457,734 | 10/1995 | Eryaman et al. | 379/58 |
| 5,491,837 | * 2/1996 | Haartsen | 455/62 |
| 5,504,803 | * 4/1996 | Yamada et al. | 379/59 |
| 5,504,939 | * 4/1996 | Mayrand et al. | 455/34.1 |
| 5,548,808 | * 8/1996 | Bruckert et al. | 455/33.2 |
| 5,613,204 | * 3/1997 | Haberman et al. | 455/423 |

FOREIGN PATENT DOCUMENTS 62 84075 10/1994 (JP).
07038943 * 2/1995 (JP).

OTHER PUBLICATIONS

International Search Report Date of Mailing: Nov. 18, 1996; re: International Appln. PCT/SE96/00511.

P. W. Baranowsky II, "MSAT and Cellular Hybrid Networking", Proceedings of the 3rd International Mobile Satellite Conference IMSC '93, pp. 149–154 (Jun. 16–18, 1993).

F. Delli Priscolli, "Network Aspects Relevant to the Integration Between the GSM Network and a Satellite System", 2nd International Conference on Universal Personal Communications. Gateway to the 21st Century, pp. 339–343 (Oct. 1993).

G. E. Corazza et al., "Handover Procedures in Integrated Satellite and Terrestrial Mobile Systems", Proceedings of the Third International Mobile Satellite Conference IMSC '93, pp. 143–148 (Jun. 16–18, 1993).

F. Delli Priscolli, "Architecture of on Integrated GSM–Satellite System", *European Transactions on Telecommunications and Related Technologies*, vol. 5, No. 5, pp. 91–99 (Sep. 1994).

* cited by examiner

*Primary Examiner*—William Cumming
*Assistant Examiner*—Darnell R. Armstrong
(74) *Attorney, Agent, or Firm*—Burns, Doane, Swecker & Mathis, L.L.P.

(57) ABSTRACT

According to exemplary embodiments of the present invention, multiple hyperband capable mobile stations and base stations are described. These mobile and base stations support multiple hyperband operations including, for example, mobile assisted channel allocation (MACA), mobile assisted handover (MAHO), cell reselection, traffic channel assignment, control channel location and registration. By bridging multiple hyperbands, service quality can be enhanced.

21 Claims, 8 Drawing Sheets

Fig. 3(a)

| BLOCK NUMBER | CHANNEL NUMBER | BAND | NUMBER OF CHANNELS | RELATIVE PROBABILITY |
|---|---|---|---|---|
| 1 | 1 - 26 | A | 26 | 4 |
| 2 | 27 - 52 | A | 26 | 5 |
| 3 | 53 - 78 | A | 26 | 6 |
| 4 | 79 - 104 | A | 26 | 7 |
| 5 | 105 - 130 | A | 26 | 8 |
| 6 | 131 - 156 | A | 26 | 9 |
| 7 | 157 - 182 | A | 26 | 10 |
| 8 | 183 - 208 | A | 26 | 11 |
| 9 | 209 - 234 | A | 26 | 12 |
| 10 | 235 - 260 | A | 26 | 13 |
| 11 | 261 - 286 | A | 26 | 14 |
| 12 | 287 - 312 | A | 26 | 15 |
| 13 | 313 - 333 | A | 21 | 16 (LOWEST) |
| | | | | |
| 14 | 667 - 691 | A' | 25 | 3 |
| 15 | 692 - 716 | A' | 25 | 2 |
| | | | | |
| 16 | 991 - 1023 | A" | 33 | 1 (HIGHEST) |

Fig. 3(b)

| BLOCK NUMBER | CHANNEL NUMBER | BAND | NUMBER OF CHANNELS | RELATIVE PROBABILITY |
|---|---|---|---|---|
| 1 | 334 - 354 | B | 21 | 16 (LOWEST) |
| 2 | 355 - 380 | B | 26 | 15 |
| 3 | 381 - 406 | B | 26 | 14 |
| 4 | 407 - 432 | B | 26 | 13 |
| 5 | 433 - 458 | B | 26 | 12 |
| 6 | 459 - 484 | B | 26 | 11 |
| 7 | 485 - 510 | B | 26 | 10 |
| 8 | 511 - 536 | B | 26 | 9 |
| 9 | 537 - 562 | B | 26 | 8 |
| 10 | 563 - 588 | B | 26 | 7 |
| 11 | 589 - 614 | B | 26 | 6 |
| 12 | 615 - 640 | B | 26 | 5 |
| 13 | 641 - 666 | B | 26 | 4 |
| | | | | |
| 14 | 717 - 741 | B' | 25 | 3 |
| 15 | 742 - 766 | B' | 25 | 2 |
| 16 | 767 - 799 | B' | 33 | 1 (HIGHEST) |

Fig. 3(c)

| BLOCK NUMBER | CHANNEL NUMBER | BAND | NUMBER OF CHANNELS | RELATIVE PROBABILITY |
|---|---|---|---|---|
| 1 | 1 - 31 | A | 31 | 16 (LOWEST) |
| 2 | 32 - 62 | A | 31 | 15 |
| 3 | 63 - 93 | A | 31 | 14 |
| 4 | 94 - 124 | A | 31 | 13 |
| 5 | 125 - 155 | A | 31 | 12 |
| 6 | 156 - 186 | A | 31 | 11 |
| 7 | 187 - 217 | A | 31 | 10 |
| 8 | 218 - 248 | A | 31 | 9 |
| 9 | 249 - 279 | A | 31 | 8 |
| 10 | 280 - 310 | A | 31 | 7 |
| 11 | 311 - 341 | A | 31 | 6 |
| 12 | 342 - 372 | A | 31 | 5 |
| 13 | 373 - 403 | A | 31 | 4 |
| 14 | 404 - 434 | A | 31 | 3 |
| 15 | 435 - 465 | A | 31 | 2 |
| 16 | 466 - 499 | A | 34 | 1 (HIGHEST) |

Fig. 3(d)

| BLOCK NUMBER | CHANNEL NUMBER | BAND | NUMBER OF CHANNELS | RELATIVE PROBABILITY |
|---|---|---|---|---|
| 1 | 668 - 698 | B | 31 | 16 (LOWEST) |
| 2 | 699 - 729 | B | 31 | 15 |
| 3 | 730 - 760 | B | 31 | 14 |
| 4 | 761 - 791 | B | 31 | 13 |
| 5 | 792 - 822 | B | 31 | 12 |
| 6 | 823 - 853 | B | 31 | 11 |
| 7 | 854 - 884 | B | 31 | 10 |
| 8 | 885 - 915 | B | 31 | 9 |
| 9 | 916 - 946 | B | 31 | 8 |
| 10 | 947 - 977 | B | 31 | 7 |
| 11 | 978 - 1008 | B | 31 | 6 |
| 12 | 1009 - 1039 | B | 31 | 5 |
| 13 | 1040 - 1070 | B | 31 | 4 |
| 14 | 1071 - 1101 | B | 31 | 3 |
| 15 | 1102 - 1132 | B | 31 | 2 |
| 16 | 1133 - 1165 | B | 33 | 1 (HIGHEST) |

Fig.3(E)

| BLOCK NUMBER | CHANNEL NUMBER | BAND | NUMBER OF CHANNELS | RELATIVE PROBABILITY |
|---|---|---|---|---|
| 1 | 1501-1531 | C | 31 | 16 (LOWEST) |
| 2 | 1532-1562 | C | 31 | 15 |
| 3 | 1563-1593 | C | 31 | 14 |
| 4 | 1594-1624 | C | 31 | 13 |
| 5 | 1625-1655 | C | 31 | 12 |
| 6 | 1656-1686 | C | 31 | 11 |
| 7 | 1687-1717 | C | 31 | 10 |
| 8 | 1718-1748 | C | 31 | 9 |
| 9 | 1749-1779 | C | 31 | 8 |
| 10 | 1780-1810 | C | 31 | 7 |
| 11 | 1811-1841 | C | 31 | 6 |
| 12 | 1842-1872 | C | 31 | 5 |
| 13 | 1873-1903 | C | 31 | 4 |
| 14 | 1904-1934 | C | 31 | 3 |
| 15 | 1935-1965 | C | 31 | 2 |
| 16 | 1966-1999 | C | 34 | 1 (HIGHEST) |

Fig.3(F)

| BLOCK NUMBER | CHANNEL NUMBER | BAND | NUMBER OF CHANNELS | RELATIVE PROBABILITY |
|---|---|---|---|---|
| 1 | 501 - 510 | D | 10 | 16 (LOWEST) |
| 2 | 511 - 520 | D | 10 | 15 |
| 3 | 521 - 530 | D | 10 | 14 |
| 4 | 531 - 540 | D | 10 | 13 |
| 5 | 541 - 550 | D | 10 | 12 |
| 6 | 551 - 560 | D | 10 | 11 |
| 7 | 561 - 570 | D | 10 | 10 |
| 8 | 571 - 580 | D | 10 | 9 |
| 9 | 581 - 590 | D | 10 | 8 |
| 10 | 591 - 600 | D | 10 | 7 |
| 11 | 601 - 610 | D | 10 | 6 |
| 12 | 611 - 620 | D | 10 | 5 |
| 13 | 621 - 630 | D | 10 | 4 |
| 14 | 631 - 640 | D | 10 | 3 |
| 15 | 641 - 650 | D | 10 | 2 |
| 16 | 651 - 665 | D | 15 | 1 (HIGHEST) |

Fig. 3(g)

| BLOCK NUMBER | CHANNEL NUMBER | BAND | NUMBER OF CHANNELS | RELATIVE PROBABILITY |
|---|---|---|---|---|
| 1 | 1168-1177 | E | 10 | 16 (LOWEST) |
| 2 | 1178-1187 | E | 10 | 15 |
| 3 | 1188-1197 | E | 10 | 14 |
| 4 | 1198-1207 | E | 10 | 13 |
| 5 | 1208-1217 | E | 10 | 12 |
| 6 | 1218-1227 | E | 10 | 11 |
| 7 | 1228-1237 | E | 10 | 10 |
| 8 | 1238-1247 | E | 10 | 9 |
| 9 | 1248-1257 | E | 10 | 8 |
| 10 | 1258-1267 | E | 10 | 7 |
| 11 | 1268-1277 | E | 10 | 6 |
| 12 | 1278-1287 | E | 10 | 5 |
| 13 | 1288-1297 | E | 10 | 4 |
| 14 | 1298-1307 | E | 10 | 3 |
| 15 | 1308-1317 | E | 10 | 2 |
| 16 | 1318-1332 | E | 15 | 1 (HIGHEST) |

Fig. 3(h)

| BLOCK NUMBER | CHANNEL NUMBER | BAND | NUMBER OF CHANNELS | RELATIVE PROBABILITY |
|---|---|---|---|---|
| 1 | 1335-1344 | F | 10 | 16 (LOWEST) |
| 2 | 1345-1354 | F | 10 | 15 |
| 3 | 1355-1364 | F | 10 | 14 |
| 4 | 1365-1374 | F | 10 | 13 |
| 5 | 1375-1384 | F | 10 | 12 |
| 6 | 1385-1394 | F | 10 | 11 |
| 7 | 1395-1404 | F | 10 | 10 |
| 8 | 1405-1414 | F | 10 | 9 |
| 9 | 1415-1424 | F | 10 | 8 |
| 10 | 1425-1434 | F | 10 | 7 |
| 11 | 1435-1444 | F | 10 | 6 |
| 12 | 1445-1454 | F | 10 | 5 |
| 13 | 1455-1464 | F | 10 | 4 |
| 14 | 1465-1474 | F | 10 | 3 |
| 15 | 1475-1484 | F | 10 | 2 |
| 16 | 1485-1499 | F | 15 | 1 (HIGHEST) |

Fig. 4(a)

| FIELD | LENGTH |
|---|---|
| PARAMETER TYPE | 4 |
| NUMBER OF TDMA NEIGHBOR CELLS (N) | 5 |
| NEIGHBOR CELL (NOTE 1) | 57-77 PER INSTANCE |

NOTE 1: UP TO "N" INSTANCES OF THIS FIELD MAY BE SENT

Fig. 4(b)

| FIELD | LENGTH |
|---|---|
| PARAMETER TYPE | 4 |
| HYPERBAND | 2 |
| NUMBER OF NEIGHBOR CELLS (P) | 5 |
| NEIGHBOR CELL (NOTE 1) | 57-77 PER INSTANCE |

NOTE 1: UP TO "P" INSTANCES OF THIS FIELD MAY BE SENT

Fig. 5(a)

| FIELD | LENGTH |
|---|---|
| PARAMETER TYPE | 4 |
| NUMBER OF MACA CHANNELS (N) | 4 |
| CHAN (NOTE 1) | 11 PER INSTANCE |

NOTE 1: N+1 INSTANCES OF THIS FIELD ARE INCLUDED

Fig. 5(b)

| FIELD | LENGTH |
|---|---|
| PARAMETER TYPE | 4 |
| HYPERBAND | 2 |
| NUMBER OF MACA CHANNELS (P) | 4 |
| CHAN (NOTE 1) | 11 PER INSTANCE |

NOTE 1: P+1 INSTANCES OF THIS FIELD ARE INCLUDED

| INFORMATION ELEMENT | TYPE | LENGTH (BITS) |
|---|---|---|
| PROTOCOL DISCRIMINATOR | M | 2 |
| MESSAGE TYPE | M | 8 |
| R F CHANNELS | M | 10-274 |

| INFORMATION ELEMENT | TYPE | LENGTH (BITS) |
|---|---|---|
| PROTOCOL DISCRIMINATOR | M | 2 |
| MESSAGE TYPE | M | 8 |
| R F CHANNEL AND HYPERBAND | M | 5-317 |

| INFORMATION ELEMENT | TYPE | LENGTH (BITS) |
|---|---|---|
| PROTOCAL DISCRIMINATOR | M | 2 |
| MESSAGE TYPE | M | 8 |
| RF CHANNEL | M | 11 |
| ATS | M | 4 |
| DVCC | M | 8 |
| DMAC | M | 4 |
| TIME ALIGNMENT | M | 5 |
| SHORTENED BURST INDICATOR | M | 2 |
| PV | M | 4 |
| SOC CHANGE INDICATOR | M | 1 |
| BSMC CHANGE INDICATOR | M | 1 |
| DTX CONTROL | M | 1 |
| REMAINING LENGTH | M | 6 |
| DELTA TIME | O | 21 |
| VOICE MODE (NOTE 1) | O | 16 |
| DATA PRIVACY MODE (NOTE 1) | O | 11 |
| MESSAGE ENCRYPTION MODE C (NOTE 1) | O | 19 |
| TARGET HYPERBAND (NOTE 2) | O | 12 |

NOTES:
1: IN THE ABSENCE OF THIS INFORMATION ELEMENT, THE MOBILE STATION SHALL ASSUME THE FEATURE SETTINGS FOR THE CURRENT DTC ARE MAINTAINED FOR THE NEW DTC.

2: IN THE ABSENCE OF THIS INFORMATION ELEMENT, THE MOBILE STATION SHALL ASSUME THAT THE NEW DTC IS IN SAME HYPERBAND AS THE CURRENT DTC.

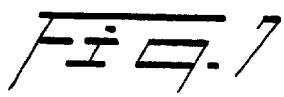

Fig. 7

MULTIPLE HYPERBAND MOBILE AND BASE STATIONS

RELATED APPLICATIONS

This application is a continuation-in-part of U.S. patent application Ser. No. 08/356,634, filed on Dec. 15, 1994 now U.S. Pat. No. 5,594,949, which application is a continuation of U.S. patent application Ser. No. 08/014,222, filed Feb. 5, 1993, now U.S. Pat. No. 5,375,123. This application is also a continuation-in-part of U.S. patent application Ser. No. 08/331,711 entitled "A Method and Apparatus for Locating a Digital Control Channel in a Radiocommunication System" and filed on Oct. 31, 1994. This application is also a continuation-in-part of U.S. patent application Ser. No. 08/147,254 entitled "A Method for Communicating in a Wireless Communication System", filed on Nov. 1, 1993.

This application is also related to U.S. patent application Ser. No. 09/009,055, entitled "Mobile Station Preferences in a Multiple Hyperband Capable Communicationg System", filed on an even date herewith to Applicants Olvera-Hernandez et al. and to U.S. patent application Ser. No. 09/426,675, entitled "Split Neighbor Lists for Multiple Hyperband Capable Cellular Communications Systems", also filed on an even date herewith to Applicants Turcotte et al. Each of the five aforementioned disclosures is incorporated here by reference.

BACKGROUND

The present invention relates to cellular communications systems and, in particular, to a multiple hyperband cellular communications system and multiple hyperband capable mobile stations for operation therein.

North American cellular communications have historically been implemented solely in the 800 MHz Cellular hyperband. The most recent evolution in cellular communications services involves the adoption of three additional hyperbands for use in handling mobile communications. Of these additional hyperbands, only the Personal Communication Services (PCS) hyperband in the 1900 MHz frequency range has been completely defined. With the existence of the new PCS hyperband, different types of subscriptions and or services like speech quality, voice privacy, and encryption may exist for one mobile station from one hyperband to another, or from one frequency band in the Cellular hyperband to another frequency band in the PCS hyperband.

The Cellular hyperband is assigned two telephone frequency bands (commonly referred to as the A frequency band and the B frequency band) for carrying and controlling communications. The PCS hyperband, on the other hand, is specified in the United States of America to include six different frequency bands (A, B, C, D, E and F). Thus, in accordance with EIA/TIA Interim Standard IS-136 (the "IS-136 specification") as modified by the PN3388-1 specification version of Sep. 9, 1994 project no. 3011-1, eight frequency bands are now available in any given service area to facilitate communications services.

Each one of frequency bands specified for the Cellular and PCS hyperbands is allocated a plurality of voice or speech channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, hand-off, and cell selection or reselection instructions as a mobile station travels out of the radio coverage of one cell and into the radio coverage of another cell. The control or voice channels may operate in either an analog mode, a digital mode, or a combination mode.

The individual frequency bands are typically assigned to, and provided within a hyperband for the service area by only one service company. For example, the A frequency band of the Cellular hyperband is usually reserved for use by non-wire line communications service companies, and the B frequency band is usually reserved for use by wire line communications service companies. In some instances, a frequency band assigned to one service company for a given cell or service area may be assigned to a different service company in another cell or service area. It is also recognized that the same service company may provide cellular communications service in multiple frequency bands within either a single hyperband or across multiple hyperbands.

Cellular hyperband mobile stations have historically been configured to operate in a particular one of the available frequency bands within the Cellular hyperband. For example, if the service company providing cellular service to the subscriber is a wire line company, the Cellular hyperband mobile station is configured with the B frequency band as its "home" frequency band. Reciprocal billing arrangements between service companies allow subscribers to place calls over non-home frequency bands in the event the mobile station is roaming. These non-home calls, however, typically require payment by the subscriber of some form of a surcharge and are therefore undesirable. Furthermore, in the absence of an agreement between service companies, roaming subscribers may not be able to make a call without operator assistance. For the service provider, use of foreign frequency bands by subscribers results in a potential loss of revenue that the provider would like to avoid.

The expansion to multiple hyperband communications capabilities as a result of the IS-136 specification has necessitated the development and placement into service of mobile stations that are capable of accessing both the Cellular and PCS hyperbands. Furthermore, the existence of multiple available hyperbands for carrying mobile station communications presents an opportunity for cellular telephone switches to control overlapping or adjacent cells in different hyperbands. It would be beneficial if the cellular communications system were configured from both the system and terminal point of view to allow multiple hyperband capable mobile stations to operate seamlessly between the available hyperbands. At the same time, however, existing mobile units which are capable of operation only in the Cellular hyperband should enjoy continued support.

SUMMARY

According to exemplary embodiments of the present invention, multiple hyperband capable mobile stations and base stations are described. These mobile and base stations support multiple hyperband operations including, for example, mobile assisted channel allocation (MACA), mobile assisted handover (MAHO), cell reselection, traffic channel assignment, control channel location and registration. By bridging multiple hyperbands, service quality can be enhanced.

BRIEF DESCRIPTION OF THE DRAWINGS

The foregoing, and other, objects, features and advantages of the present invention will be more readily understood upon reading the following detailed description in conjunction with the drawings in which:

FIGS. 3(a)–3(h) depict exemplary probability blocks for multiple hyperband control channel location according to an exemplary embodiment of the present invention;

FIGS. 4(a) and 4(b) illustrate exemplary messages related to cell reselection according to an exemplary embodiment of the present invention;

FIGS. 5(a) and 5(b) illustrate exemplary messages related to MACA techniques according to an exemplary embodiment of the present invention;

FIG. 7 is an exemplary multiple hyperband handover message according to an exemplary embodiment of the present invention.

DETAILED DESCRIPTION

Figure 1:
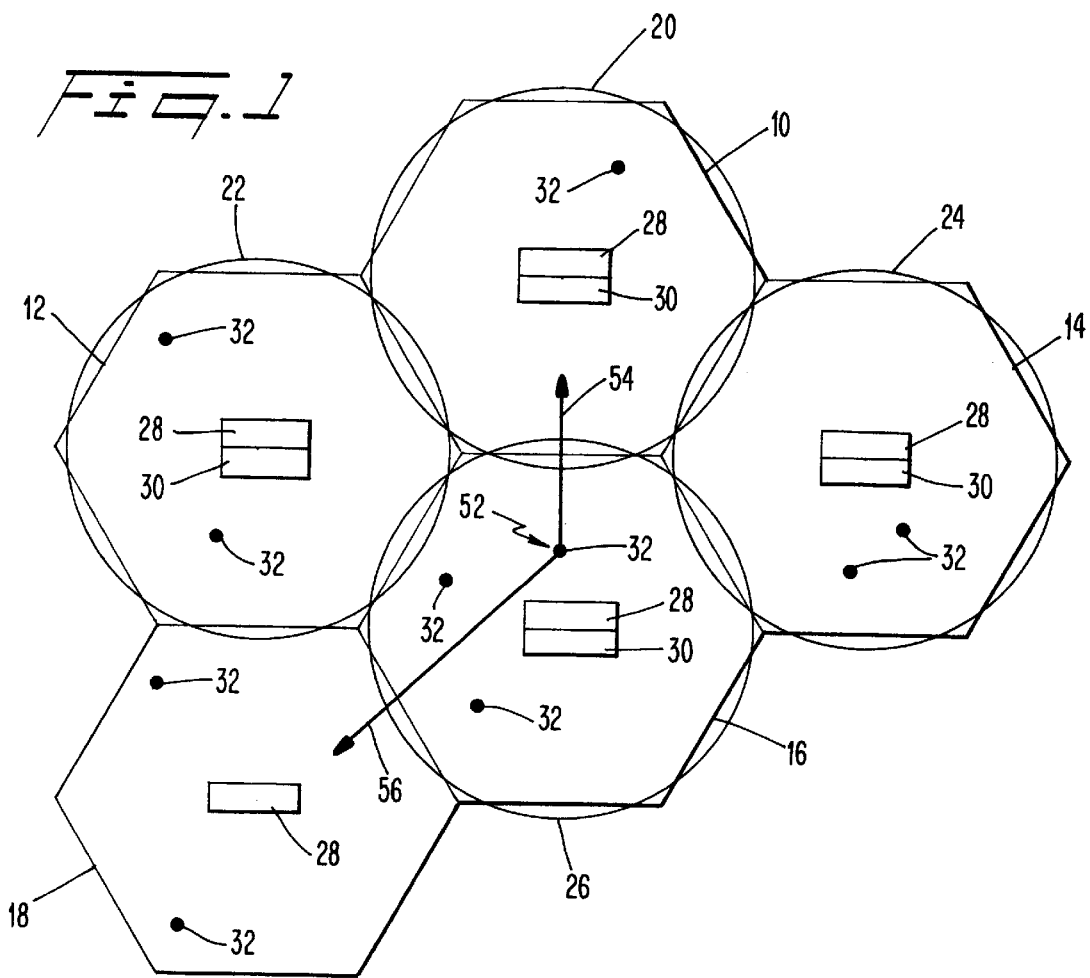
FIG. 1 is a cell diagram illustrating an exemplary cell configuration for a multiple hyperband cellular communications system of the present invention.

Reference is now made to FIG. 1 wherein there is shown a cell diagram illustrating an exemplary cell configuration for a multiple hyperband cellular communications system according to the present invention. An arbitrary geographic area (hereinafter "the service area") is divided into a plurality of cells 10–18 and 20–26 utilizing both the Cellular and PCS hyperbands. The cells 10–18 are represented by hexagrams and comprise communications cells wherein one or both of the separate frequency bands (A and B) available in the Cellular hyperband are provided via multiple channels. Cells 20–26, on the other hand, are represented by circles and comprise communications cells one or more of the six separate frequency bands (A through F) of radio frequency cellular communications are provided to mobile stations via multiple channels in the PCS hyperband.

Each of the Cellular hyperband cells 10–18 includes at least one base station 28 configured to facilitate communications over certain channels in at least one of the two available Cellular hyperband frequency bands. Similarly, each of the PCS hyperband cells 20–26 includes at least one PCS base station 30 configured to facilitate communications over certain channels in at least one of the six available PCS hyperband frequency bands. It will, of course, be understood that each cell 10–18 and each cell 20–26 may include more than one base station 28 and 30, respectively, if for example, different service companies are providing cellular communications services on different frequency bands within the same cell.

The base stations 28 and 30 are illustrated as being positionally located at or near the center of each of the cells 10–18 and 20–26, respectively. However, depending on geography and other known factors, the base stations 28 and 30 may instead be located at or near the periphery of, or otherwise away from the centers of, each of the cells 10–18 and 20–26. In such instances, the base stations 28 and 30 may broadcast and communicate with mobile stations 32 located within the cells 10–18 and 20–26 using directional rather than omni-directional antennas. Each one of the base stations 28 and 30 includes a transmitter, a receiver, and a base station controller connected to the antenna in a manner and with a configuration well known in the art.

There are a number of mobile stations 32 shown operating within the service area of the system of the present invention. These mobile stations 32 each possess the requisite functionality for operating in both the Cellular hyperband and the PCS hyperband (i.e., they are multiple hyperband communications capable). The configuration and operation of the mobile stations 32 will be described in more detail herein with respect to FIG. 2. It will, of course, be understood that existing Cellular hyperband only mobile stations (not shown) are compatible with the system of the present invention, but will only be able to communicate with Cellular hyperband base stations 28.

Figure 2:
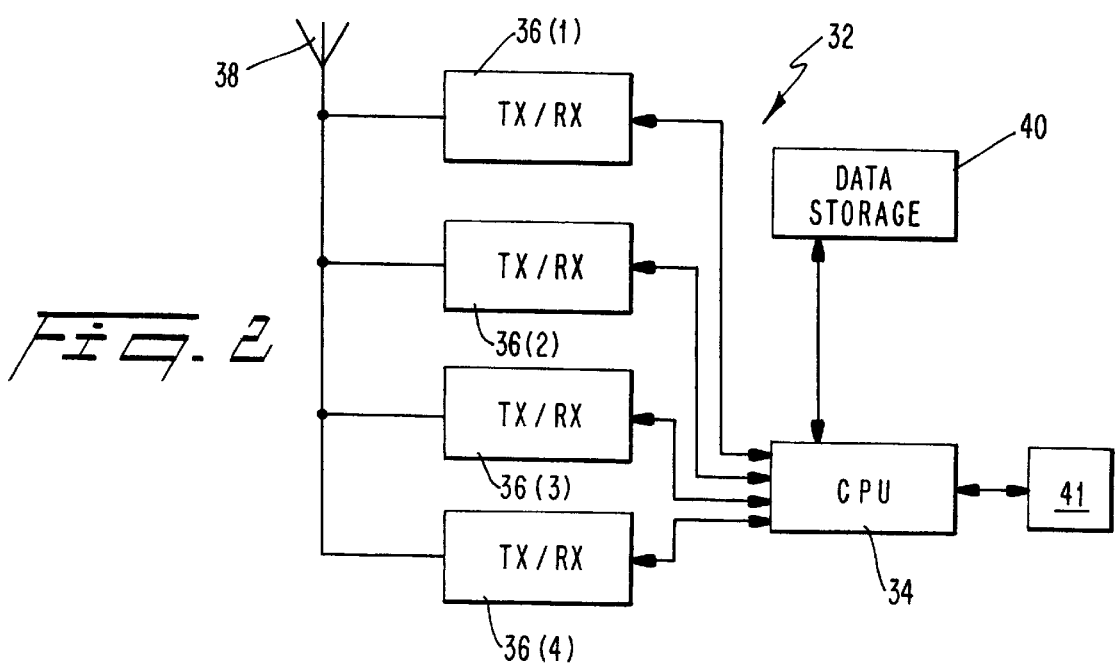
FIG. 2 is a simplified block diagram of a multiple hyperband mobile station programmable with hyperband and frequency band selection criteria in accordance with the present invention.

Reference is now made to FIG. 2 wherein there is shown a simplified block diagram of a multiple hyperband mobile station 32 according to an exemplary embodiment of the present invention. The mobile station 32 includes a processor (CPU) 34 connected to a plurality of transceivers 36. The transceivers 36 are each configured to operate in the frequency bands and channels of a different hyperband. For example, the transceiver 36(1) functions on multiple channels in at least one of the frequency bands of the 800 MHz frequency range, and is thus utilized by the mobile station 32 for communicating over the Cellular hyperband. The transceiver 36(2), on the other hand, functions on multiple channels in at least one of the frequency bands of the 1900 MHz frequency range, and is thus utilized by the mobile station 32 for communicating over the PCS hyperband. The remaining transceivers 36(3) and 36(4), if included, function in other frequency ranges; for example, comprising those additional frequency ranges identified by the IS-136 specification for other soon to be made available hyperbands. By means of an output signal from the processor 34, the frequency band and precise channel therein on which the transceivers 36 operate for communications may be selected. An antenna 38 is connected to the transceivers 36 for transmitting and receiving radio communications (both voice and data) over the cellular communications network utilizing, for example, the base stations 28 and 30 of FIG. 1. A data storage device 40 (preferably in the form of a read only memory—ROM—and a random access memory—RAM) is also connected to the processor 34. The data storage device 40 is used for storing programs and data executed by the processor 34 in controlling operation of the mobile station 32. There are other components 41 included in the mobile station 32 (like a handset, keypad, etc.) and not specifically shown in FIG. 2 whose nature, operation and interconnection with the illustrated components are well known to those skilled in the art.

The primary modes of operation of the mobile station 32 of interest herein are: an idle operating mode, wherein the mobile station awaits use through either the receipt or initiation of a call; and, an on call operating mode, wherein the mobile station is being used by the subscriber to engage in a call. Both of these modes will now be described in more detail below with an emphasis on functions performed by the base stations and the mobile stations to provide seamless operation across different hyperbands.

When in the idle state, a mobile station tunes to and then continuously monitors the strongest control channel at its known frequency (generally, the control channel of the cell in which the mobile station is located at that moment) and may receive or initiate a telephone call through the corresponding base station. When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels at their known frequencies in operation in the cellular system to find the "best" control channel. When a control channel with good reception quality is found, the mobile station remains tuned to this channel until the quality deteriorates again. In this manner, all mobile stations are nearly always "in touch" with the system.

As can be seen from the foregoing, speedy location of control channels is significant with respect to overall system performance. If the control channels are not located on predetermined and fixed frequencies, then the mobile stations have to search for the control channels. As described in the above-incorporated U.S. patent application Ser. No. 08/331,711 entitled "A Method and Apparatus for Locating a Digital Control Channel in a Radiocommunication System" and filed on Oct. 31, 1994 (hereafter referred to as the "control channel locator application"), control channel location is expedited by, for example, prescribing a search pattern based on a relative likelihood of finding a control channel on a particular frequency or group of frequencies. According to exemplary embodiments of the present invention, this concept can be extended to multiple hyperband systems as follows.

For each of the frequency bands in each of the hyperbands available, e.g., bands A and B for the Cellular hyperband and bands A–F for the PCS hyperband, channels are grouped into probability blocks which are ranked in accordance with the relative likelihood of finding the digital control channel in each block. Exemplary groupings are illustrated in FIGS. 3(a)–3(h). These groupings can be stored in the data storage device 40 of each multiple hyperband capable mobile station 32. To locate a control channel, a frequency band within one of the available hyperbands in which a control channel is desired is selected, as for example described in the above-incorporated patent application entitled "Mobile Station Preferences in a Multiple Hyperband Capable Communications System". Then, a mobile unit can look for a digital control channel within a highest ranked probability block, followed by a second highest ranked probability block and so on, until one is located. Each channel can be examined by the mobile station as described in the control channel locator patent application.

Having located and tuned to a control channel, but while still in the idle operating mode, the mobile station 32 receives a neighbor list from the cellular system via a communications broadcast from the base stations 28 or 30 identifying cell neighbors (i.e., other base stations) that are available for server selection. The mobile station can measure on one or more of the channels to identify a new server when, for example, its current server no longer satisfies certain transmission criteria. For multiple hyperband capable mobile stations 32, the neighbor list can include information pertaining to servers operating on the Cellular hyperband, as well as servers operating on the PCS hyperband. For example, the system can transmit a message having the exemplary format illustrated in FIG. 4(a) to identify, as part of a neighbor list, one or more servers in the same hyperband as the control channel to which the mobile station 32 is currently listening. Similarly, for candidate servers on other hyperbands, the system can transmit a message having the exemplary format seen in FIG. 4(b). Although the exemplary message formats of FIGS. 4(a) and 4(b) provide a two bit length field for identifying a hyperband (e.g., 00=Cellular hyperband, 01=PCS hyperband, others reserved), those skilled in the art will appreciate that additional bits could be used to identify more than four different hyperbands. Alternatively, a single message can be transmitted which identifies a particular hyperband associated with each channel to be measured.

Registration is performed in radiocommunication systems to, among other reasons, inform the system of each mobile's general location, e.g., in which cell or cells a mobile station is currently located. Registration can be performed periodically or after certain events occur, such as power up or power down, or both periodically and after certain events occur. Once a mobile station has registered with the system, the system can then direct pages to the mobile station on the appropriate control channel(s). However, the advent of multiple hyperbands adds further complexities to this issue. As described above, an idle mobile station 32 can switch between different hyperbands by way of cell reselection according to exemplary embodiments of the present invention. Thus, according to an exemplary embodiment of the present invention illustrated in FIG. 6, a mobile station which switches hyperbands will also register with the system so that the system knows on which hyperband to issue subsequent paging messages. For example, if mobile station 32 is first listening to a control channel on the Cellular hyperband transmitted by a base station 28 and subsequently begins listening to a control channel on the PCS hyperband transmitted by a base station 30, then that mobile station will issue a registration message to the system providing, among other data, an indicator of the new hyperband within which it is now listening. In this way, the system need not page the mobile station 32 using base stations 28.

Figures 6, 8A, 8B:
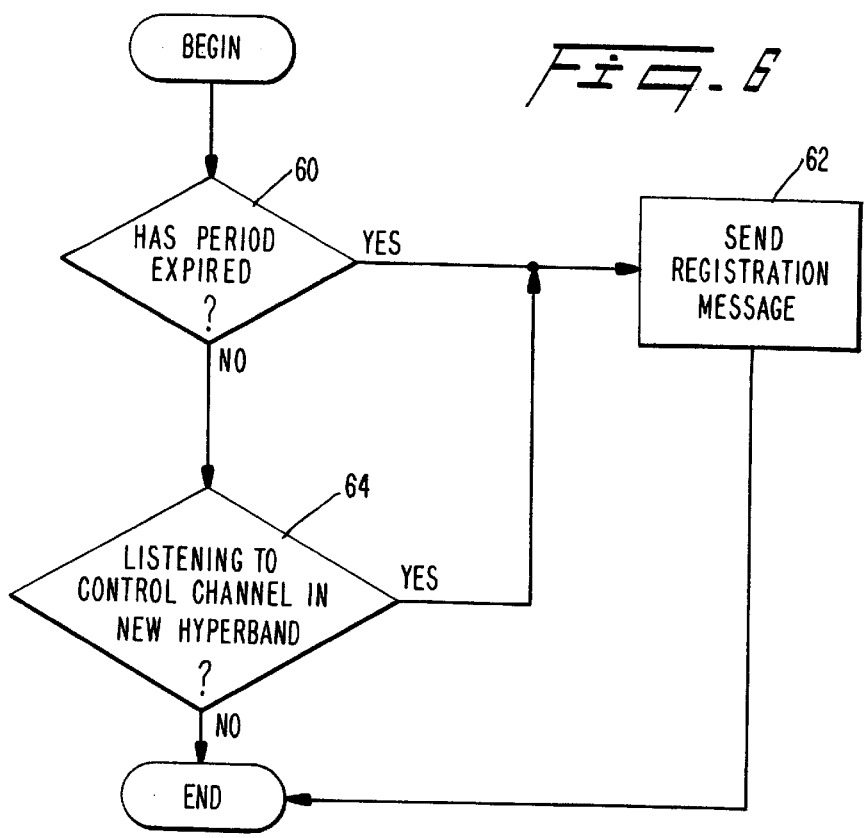
FIG. 6 is a flowchart illustrating an exemplary multiple hyperband registration technique according to an exemplary embodiment of the present invention.
FIGS. 8(a) and 8(b) illustrate exemplary messages related to MAHO techniques according to an exemplary embodiment of the present invention.

FIG. 6 is a flowchart illustrating an example of registration according to the present invention. Therein, the mobile station determines if a period has expired for registration at block 60. If so, then the mobile sends a registration message to the system at block 62. The mobile station checks to see whether the current control channel is within the same hyperband as the control channel to which the mobile station was listening at the time of the last registration message at block 64. If not, then the mobile station will also register at block 62. Otherwise, no registration occurs during this cycle. Of course those skilled in the art will readily appreciate that FIG. 6 is only an example since this exemplary embodiment is readily combinable with other conventional forms of registration as mentioned above. For example, if a system did not use periodic registration, then block 60 could be replaced by other event-driven types of registration.

Another function which can be performed by idle mobile stations 32 is mobile assisted channel allocation (MACA). Using a MACA technique, idle mobile stations are instructed to measure either or both of the word error rate or received signal strength on channels designated by the serving base station 28 or 30. The base station can, for example, instruct these idle mobile stations to perform such measurements via transmission overhead signalling to all of the mobile stations, e.g., the broadcast control channel (BCCH). Having made measurements on the identified frequencies, the mobile stations 32 then report this information to the base station so that the information can be used in allocating channels (traffic and/or control channels) throughout the system.

For example, the system can send a list of up to eight frequencies on the BCCH which all idle mobile stations shall measure the signal strength of and report to the base station. The number of frequencies to be measured can be variable, as can the selection of method for determining signal quality. As with the foregoing exemplary embodiment related to cell reselection, a message such as that seen in FIG. 5(a) can be transmitted to a mobile station instructing to measure on channels within a current, serving hyperband, An analogous message, an exemplary version thereof depicted in FIG. 5(b), can be transmitted to the mobile for measuring on channels which are in a different hyperband. Alternatively, a single message identifying the specific hyperband, whether serving or other, associated with each frequency to be measured can be issued by the system. The mobile stations can be instructed by the system to measure each listed frequency a predetermined number of times, e.g., 4 times, with a predetermined spacing between measurements, e.g., 20 ms. A resultant average of either signal strength or error rate can then be calculated and returned to the base station.

As another example, the idle mobile station can be instructed by the system to measure the quality of the serving digital control channel (DCC), i.e., the control channel that the idle mobile station is locked and listening to, by performing a running average over a last predetermined number, e.g., 32, of readings of its associated paging channel (PCH) for both signal quality, e.g., word error rate, and signal strength, e.g., RSS. The mobile station can be instructed to perform either or both of the above described measurements continuously or just before the idle mobile station accesses the system.

The system can also instruct the idle mobile stations regarding when reports should be sent informing the system of the measurement results and what information these reports should contain. For example, the idle mobile station (s) can be instructed to inform the system of the measurement results when they make a predetermined type of access to the system, e.g., a registration access and/or an origination access. In such reports, the mobile station can be instructed to include information pertaining to, for example, one or more of: what type of measurements were made (i.e., the DCC or other channels or both), whether the report is based on a full measurement interval and the measurement results themselves.

In the on call operating mode, mobile station 32 may experience a degradation in connection signal quality due to the changing interference conditions caused by its own movement and/or other system variations. Once a connection's quality drops below an acceptable threshold, the mobile station will be instructed to changeover to a new frequency to continue the connection. The techniques for handling this changeover are known as handover or handoff techniques and describe the interaction between the original serving base station, candidate replacement serving base stations and the mobile station being served. Many different types of handover techniques are known and used in radiocommunication systems today, such as so-called soft handover wherein both an original serving base station and the replacement serving base station transmit the same information to the mobile station for a period of time to create a seamless transfer of the connection, as well as transmission diversity.

According to exemplary embodiments of the present invention, a multiple hyperband capable mobile station can be handed over from a traffic channel in one hyperband to a traffic channel in another hyperband. For example, referring to FIG. 1, a mobile station 32 which is in the midst of a connection being served by PCS hyperband base station 30 in cell 26 moves into cell 18. Since base station 28 in cell 18 can now provide a better quality connection to this particular mobile station, it is desirable to handover the connection from the PCS hyperband base station 30 in cell 26 to the Cellular hyperband base station 28 in cell 18. This can be accomplished, for example, by transmitting a signal from base station 30 in cell 26 to the mobile station 32 informing the mobile station of the new frequency and hyperband to which it should tune to continue the connection. As an example, the handover message can have the format shown in FIG. 7. Note that this exemplary handover message implies the current hyperband when the field for a target hyperband is omitted. Those skilled in the art will appreciate that a hyperband indicator, regardless of whether the target hyperband is the current or a different hyperband, for each handover message could alternatively be provided.

One way to identify the particular new frequency and hyperband to which a handover should be made is known as mobile assisted handover (MAHO). By way of MAHO techniques, the mobile station can assist in the selection of an appropriate handover frequency and hyperband by measuring on candidate traffic channels and reporting these measurements to the base station. For example, a connected mobile station can measure on other frequencies during time slots in which it is idle, i.e., those which are not being used to support the connection. According to the present invention, the mobile station receives a MAHO list identifying cell neighbors that the mobile station should scan for and measure on for purposes of effectuating a hand-off when the mobile station moves from cell to cell. This list informs the mobile station of both the channel and the hyperband on which to measure.

FIGS. 8(a) and 8(b) depict exemplary message formats for instructing a mobile to measure channels disposed in its current hyperband and for instructing a mobile station to measure channels disposed in a hyperband other than that to which it is currently listening, respectively. Alternatively, a single message format could be provided which identifies specific channels and hyperbands without relying on absence of an indicator as an assumption that the current hyperband is implied.

The above-described exemplary embodiments are intended to be illustrative in all respects, rather than restrictive, of the present invention. Thus the present invention is capable of many variations in detailed implementation that can be derived from the description contained herein by a person skilled in the art. For example although the present invention has been described with respect to operation in the Cellular and PCS hyperbands, it will be understood that the disclosed invention may be implemented in and across any of a number of available hyperbands. All such variations and modifications are considered to be within the scope and spirit of the present invention as defined by the following claims.

What is claimed is:

1. A signaling method in a radiocommunication system comprising the steps of:

transmitting a message on a signaling channel of a first hyperband instructing at least one mobile station to perform measurements on at least one frequency; and including, as part of said message, a list of said at least one frequency with an associated second hyperband indication on which said at least one mobile station is to perform said measurements.

2. The signalling method of claim 1, wherein said measurements include signal strength measurements.

3. The signalling method of claim 1, wherein said measurements include word error rate measurements.

4. The signalling method of claim 1, wherein said at least one frequency is a traffic channel frequency.

5. The signalling method of claim 1, wherein said step of including further comprises the step of:

providing said hyperband indication as a separate field in said message.

6. A signaling method in a radiocommunication system comprising the steps of:

transmitting a message on a signaling channel of a first hyperband instructing at least one mobile station to perform measurements on at least one frequency; and including, as part of said message, a list of said at least one frequency in one of a plurality of hyperbands on which said at least one mobile station is to perform said measurements.

7. The signalling method of claim 6, wherein said step of including further comprises the step of:

providing said hyperband indication as a separate field in said message.

8. A signalling method in a multiple hyperband radiocommunication system comprising the steps of:

receiving, at a mobile station, a message from a fixed part of said radiocommunication system listing at least one frequency on which said mobile station is to perform a measurement and identifying a hyperband associated with said at least one frequency;

performing a measurement by the mobile on said at least one frequency in said hyperband; and transmitting a measurement value from the mobile to the fixed part of the radiocommunication system.

9. The signalling method of claim 8, wherein said measurement is a signal strength measurement.

10. The signalling method of claim 8, wherein said measurement is a word error rate measurement.

11. The signalling method of claim 8, wherein said at least one frequency is a traffic channel frequency.

12. A registration method for a multiple hyperband radiocommunication system comprising the steps of:

receiving, in a base station, a registration message from a mobile station which has switched from listening to a first control channel transmitted on a first hyperband to a second control channel transmitted on a second hyperband; and transmitting a paging message to said mobile station only over at least one second control channel on said second hyperband.

13. The method of claim 12, wherein said first control channel and said at least one second control channel are the same control channel.

14. A method for locating a digital control channel among mixed traffic and control channels in a multiple hyperband radiocommunication system comprising the steps of:

grouping channels from at least one frequency band of each hyperband into a plurality of blocks;

ranking each of said blocks within each frequency band based upon a relative likelihood of finding a control channel therein;

storing said ranked blocks in a table for each frequency band in a mobile station;

selecting, by said mobile station, one of said tables associated with a preferred frequency band; and examining a channel within a highest ranked one of said ranked blocks.

15. The method of claim 14, further comprising the steps of:

determining if said channel is a digital control channel; and continuing, if said channel is not a digital control channel, to examine channels from within said highest ranked one of said ranked blocks until a digital control channel is located.

16. A method for handing over a connection in a multiple hyperband radiocommunication system comprising the steps of:

determining that said connection is to be handed over from a first frequency in a first hyperband to a second frequency in a second hyperband; and transmitting, from a fixed part of the system, a handover message including a first identifier of said second frequency and a second identifier said second hyperband.

17. A method for handing over a connection from a first frequency to a second frequency in a multiple hyperband radiocommunication system comprising the steps of:

receiving, at a mobile station, a handover message including an identifier of said second frequency;

assuming, by said mobile station, that said second frequency is within a same hyperband as said first frequency absent receipt of data in said handover message identifying a new hyperband; and handing over said connection to said second frequency in either said same or said new hyperband.

18. A method for handing over a connection from a first frequency to a second frequency in a multiple hyperband radiocommunication system comprising the steps of:

receiving, at a mobile station, a handover message including an identifier of said second frequency and an identifier of one of at least two hyperbands associated with said second frequency; and handing over said connection to said second frequency in said one of at least two hyperbands.

19. A method for reselecting control channels in a multiple hyperband radiocommunication system comprising the steps of:

transmitting, from a base station, a neighbor list identifying candidate control channels for reselection on a frequency in a first hyperband; and including in said list an identifier specifying at least one control channel in a second hyperband for said mobile station to measure.

20. A method for reselecting control channels in a multiple hyperband radiocommunication system comprising the steps of:

receiving, in a mobile station and on a first frequency in a first hyperband, a neighbor list identifying candidate control channels each having a second frequency and an associated second hyperband for reselection; and measuring, by said mobile station, said candidate control channels on the hyperband identified in said neighbor list.

21. A method for assigning traffic channels in a multiple hyperband radiocommunication system comprising the steps of:

transmitting, from a fixed part of said radiocommunication system, a list of channels, each of said channels being associated with an indicated hyperband;

receiving, at a mobile station said list of channels and said hyperband indication;

measuring, by said mobile station on each of said channels in said indicated hyperband;

reporting said measurements to said fixed part of said system; and assigning a channel in one of at least two hyperbands to said mobile station based upon said reported measurements.

* * * * *